United States Patent [19]

Mueller

[11] Patent Number: 5,111,973
[45] Date of Patent: May 12, 1992

[54] DISCHARGE DEVICE FOR DISPENSING CONTAINER

[76] Inventor: Martin Mueller, 4929 E. Lake Shore Dr., Wonder Lake, Ill. 60097

[21] Appl. No.: 626,561

[22] Filed: Dec. 12, 1990

[51] Int. Cl.⁵ .............................................. B67D 5/42
[52] U.S. Cl. .................................... 222/386; 99/494; 426/110; 426/115; 426/130
[58] Field of Search ............... 222/386; 99/452, 494; 426/110, 112, 115, 124, 130

[56] References Cited

U.S. PATENT DOCUMENTS

| | | | |
|---|---|---|---|
| 2,166,437 | 7/1939 | Howie et al. | 222/386 |
| 2,166,619 | 7/1939 | Becker | 220/56 |
| 3,291,128 | 12/1966 | O'Neil | 222/386 |
| 3,342,609 | 9/1967 | Bank et al. | 99/137 |
| 3,417,862 | 12/1968 | Fong | 206/56 |
| 3,459,296 | 8/1969 | Berg | 206/56 |
| 3,595,449 | 7/1971 | Stump et al. | 222/386 |
| 4,215,460 | 8/1980 | Amberg et al. | 29/429 |

FOREIGN PATENT DOCUMENTS

| | | | |
|---|---|---|---|
| 769271 | 6/1934 | France | 426/115 |
| 969222 | 5/1950 | France | 222/386 |
| 316426 | 7/1971 | U.S.S.R. | 222/386 |

Primary Examiner—Michael S. Huppert
Assistant Examiner—Joseph A. Kaufman
Attorney, Agent, or Firm—Mathew R. P. Perrone Jr.

[57] ABSTRACT

A food container includes a tubular container with a piston therein. The piston has a first guiding platform secured to a stick and a second sealing platform secured to the stick. The first platform has a tapered edge with a diameter slightly less than a diameter of the tubular container. Below the first platform is a second platform having a diameter slightly larger than the tubular container.

19 Claims, 3 Drawing Sheets

DISCHARGE DEVICE FOR DISPENSING CONTAINER

This invention relates to a discharge device for a dispensing container and more particularly to an improved piston for use with the dispensing container for semisolid materials.

BACKGROUND OF THE INVENTION

An especially suitable way to market semisolid materials such as ice cream or a similar food is to store the food material in a cylindrical paperboard or plastic tube from which the material may be dispensed. Dispensing of the food material occurs by a piston or plunger slidably and sealably mounted within the tube and moved through the tube thereby forcing the food material therein out the other end of the tube. A desired amount of the food material may be exposed from the tube and consumed while the remainder of the food material is contained in the tube until it is desired to expose the same.

It is highly desirable to have the container produced at a very low cost, while providing durability and simplification in assembling and filling the container. It is difficult to have a durable container that is simple to assemble while being able to hold the desired material. If it is desired to make a very tight fit, the assembly becomes more difficult. If it is desired to loosen the fit, in order to make assembly easier, the holding of the material and the functioning of the device is infringed. Accordingly, balancing the problems relating to ease of assembly with ease of the dispensing are contrary forces, which must be compromised in order to obtain an effective dispensing mechanism, while at the same time achieving the required seal for such work.

A tpical prior art device had a cardboard piston with a wooden stick. This can be a problem. Sometimes the stick can penetrate the food material without pushing the food material out of the tube. At other times the cardboard seal between the tube and the piston is insufficient to support the same in a proper fashion. Accordingly, the advantages of having the condiments stored in this manner are mitigated by the defective part of the piston.

The three part container resulting from the cylinder and a two part piston is also a problem for assembly. Such an extra part involved in assembly adds to the cost of the container. But without the three-piece function, positioning for assembly of the container becomes critical. Accounting for that criticality is also costly. If the assembly can be simply accomplished by a simple structure with only two pieces to assemble, that is the cylinder and a one piece piston, great advantages are obtained.

SUMMARY OF THE INVENTION

Therefore, among the many objectives of this invention is to provide an improved container for a semisolid material having a tube and piston follower for dispensing the semisolid material.

A further objective of this invention is to provide an improved container for a semisolid material having a tube and piston follower including an improved piston.

A still further objective of this invention is to provide an improved container for a semisolid material to dispense the semisolid material from the tube.

Yet a further objective of this invention is to provide an improved container for a semisolid material at a low cost.

Also a further ojbective of this invention is to provide an improved container for a semisolid material which is durable.

Another objective of this invention is to provide an improved container for a semisolid material which may be assembled in a simple fashion.

Yet another objective of this invention is to provide an improved container for a semisolid material which may be filled in a simple fashion.

Still another objectiv of this invention is to provide an improved contaner for a semsolid material which avoids a three-piece assembly.

A further objective of this invention is to provide an improved container for a semisolid material having a one-piece piston.

A still further objective of this invention is to provide an iproved container for a semisolid material to dispense the semisolid material from the tube, while avoiding penetration of the material without pushing the food material out of the tube.

Yet a further objective of this invention is to provide an improved container with an improved seal between the tube and the piston.

These and other objects of this invention are met by providing a container having a tube with piston therein. The piston has a first guiding platform secured to a stick and a second sealing platform secured to the stick.

BRIEF DESCRIPTION OF THE DRAWINGS

Throughout the figures of the drawings where the same part appears in more than one figure of the drawings, the same number is applied thereto.

DESCRIPTION OF THE PREFERRED EMBODIMENTS

Ice cream or a similar food may be dispensed from a container including a tube with a piston inserted therein to force the food or other material out of the tube in desired increments. The piston of this invention is one piece and includes a stick with two platforms secured thereto or as a part thereof. The piston may be made of any suitable approved, food-safe material. A typical piston is made of polypropylene. Likewise, the tube may be made of any flexible, food-safe material—such as cardboard, plastic and the like.

Ice cream and like food items are dispensed from a plastic piston and tubular container. These items are semisolid. The piston has a partially flexible pair of platforms parallel to each other and perpendicular to a stick. The first platform has a tapered edge with a diameter slightly less than a diameter of the tubular container. Below the first platform is a second platform having a diameter slightly larger than the tubular container.

Upon insertion of the piston into the tubular container, the first platform enters the tubular container first and directs the piston therein. The second platform frictionally locks into the tubular container due to its larger diameter when compared to the tubular container. It is either platform flexibility, tubular container stretching, or combinations thereof that provide for sealing relationship between the tubular container and piston.

Figure 1:
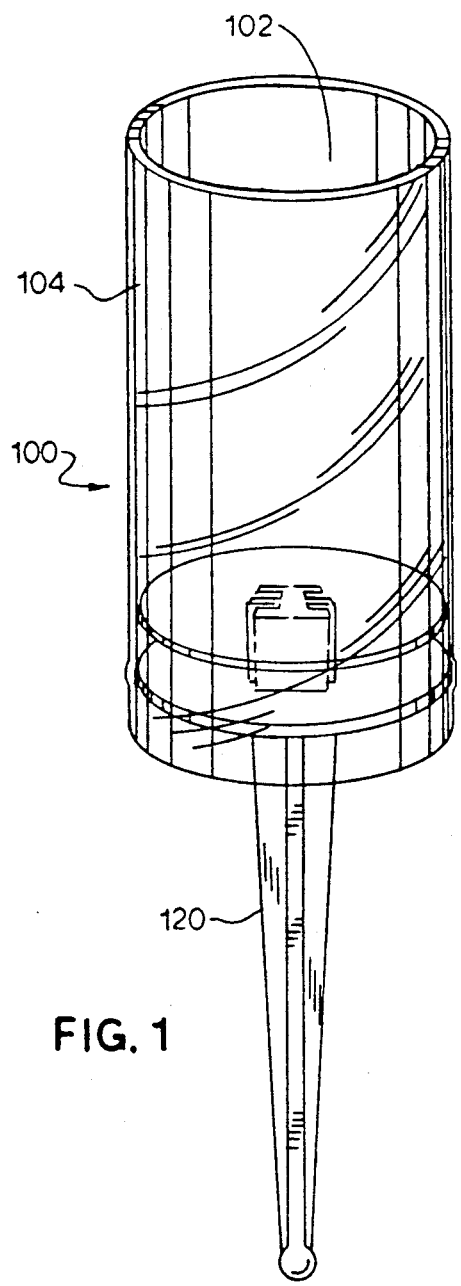
FIG. 1 depicts a perspective view of a container 100 of this invention.
Figure 2:
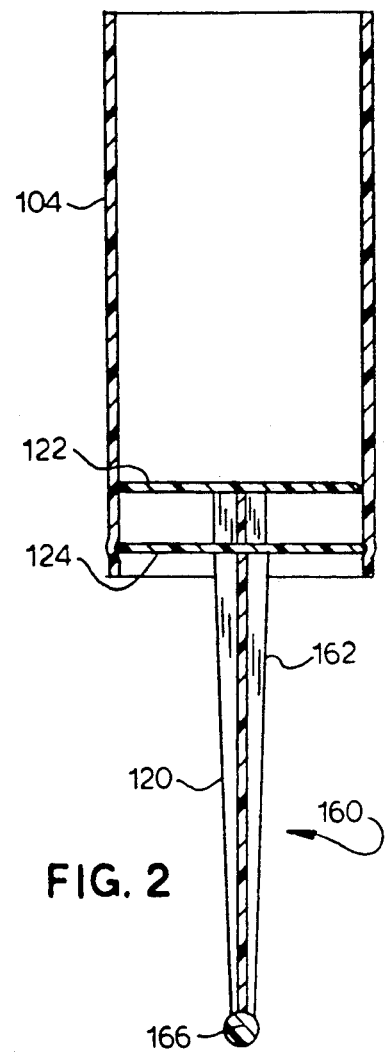
FIG. 2 depicts a side, cross-sectional view of a container 100 of this invention.
Figure 6:
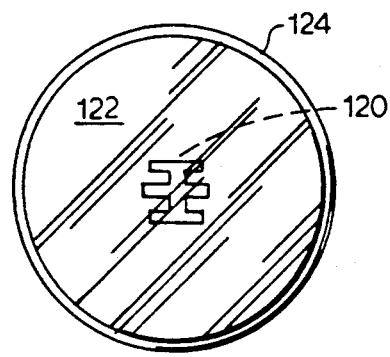
FIG. 6 depicts a top, plan view of piston 120 of this invention.
Figure 7:
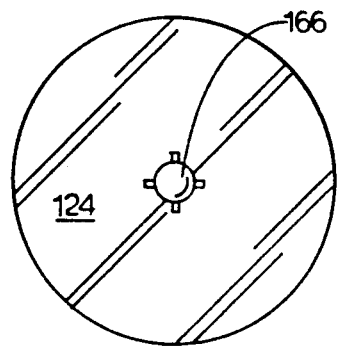
FIG. 7 depicts a bottom, plan view of piston 120 of this invention.
Figure 3:
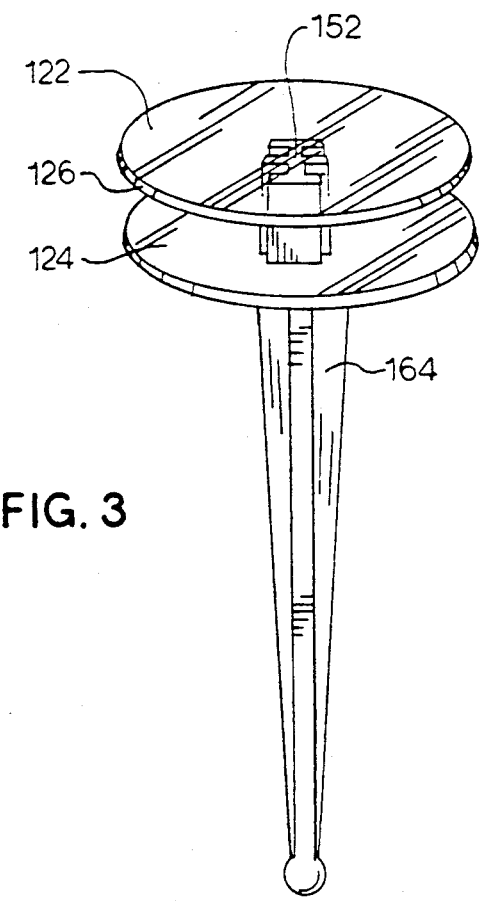
FIG. 3 depicts a top perspective view of piston 120 of this invention.
Figure 4:
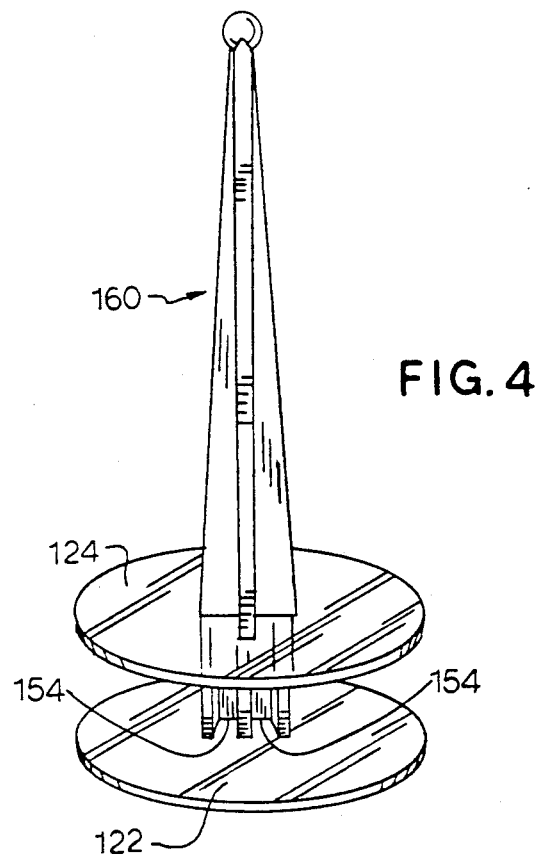
FIG. 4 depicts a bottom perspective view of piston 120 of this invention.
Figure 5:
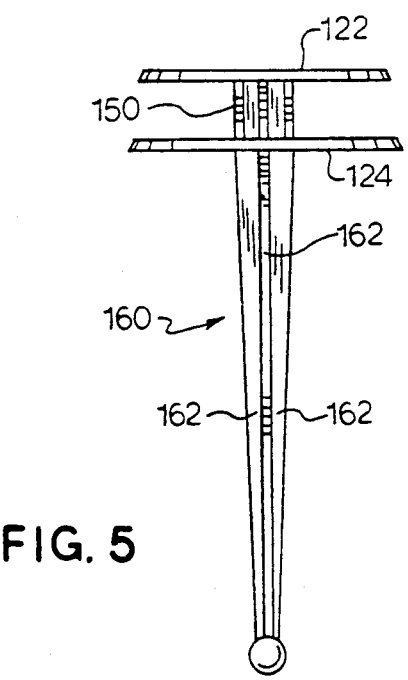
FIG. 5 depicts a side view of piston 120 of this invention.

Referring now to FIG. 1 and FIG. 2, the container 100 having food 102 includes a tube 104. Ice cream and like food items are dispensed from the tube 104 by sliding piston 120 upwardly and further into tube 104. As piston 120 is moved upwardly in the tube 104, the food 102 is exposed for consumption in desired increments.

When considering FIG. 3, FIG. 4, FIG. 5, FIG. 6, FIG. 7 and FIG. 8, the structure of piston 120 becomes clear. Piston 120 includes a top first platform 122 at one end thereof. Slightly below top first platform 122 is a sealing second platform 124. The top first platform 122 has a first tapered edge 126 and a slightly smaller diameter of than the diameter of tube 104.

The sealing second platform 124 does not require a tapered edge such as first tapered edge 126 and has a slightly larger diameter than the diameter of tube 104. However, second sealing platform 124 may have a second tapered edge 125, in order to assist with the insertion of piston 120 into tube 104.

Both first tapered edge 126 and second tapered edge 125 may have any suitable taper. The taper thereof may be rounded or flat as desired. Second tapered edge 125 is preferred to work in consort with first tapered edge 126 to assist insertion of piston 120 in tube 104.

The diameter of top first platform 122 assists the insertion of piston 120 into tube 104 due to both the taper and slightly smaller diameter. The flexibility of tube 104 combined with the larger diameter and possible flexibility of sealing second platform 124 provides for a tight seal between tube 104 and piston 120 at second platform 124, to thereby efficiently remove food 102 from tube 104 for consumption.

Figure 8:
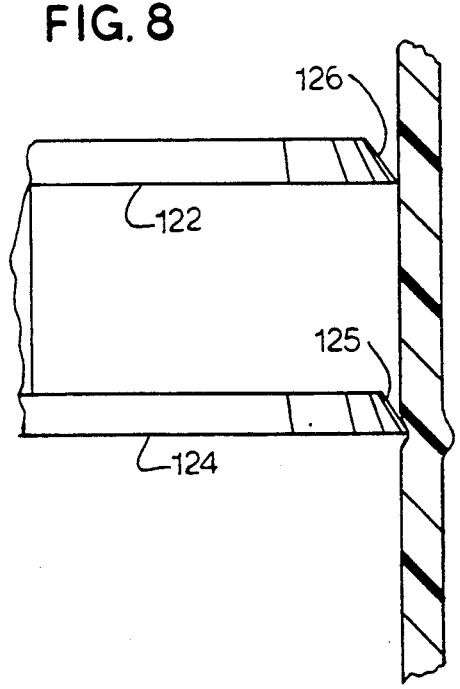
FIG. 8 depicts a magnified view of edge 126 of top first platform 122 in relation to tube 104.

Both top first platform 122 and sealing second platform 124 are at least partially inserted into tube 104 prior to filling with food 102. The first platform 122 directs the piston 120 into the tube 104, and the second platform 124 frictionally locks the piston 120 into the tube 104 due to its larger diameter. As shown in FIG. 8, tapered edge 126 of first platform 122 has the smaller taper inserted first into tube 104. The smaller taper assists the insertion too.

The support 150 between first platform 122 and second platform 124 may be of any suitable shape. Their particularly disclosed shape for support 150 appears to be a pair of H-shaped members 152. Each of H section 154 of members 152 share an arm 156. This provides a three pillared shape with a strong cross supported. Thus, the H-shaped member 152 provide a very strong structure between first platform 122 and second platform 124.

The piston 120 has a stick portion 160 below the second platform 124 and oppositely disposed from first platform 122. Stick portion 160 is shown as fluted, having four (4) equal supports 162 surrounding a center portion 164 divisions tapering to a ball 166 on the end of the stick portion 160. Ball 166 is on an end of piston 120 oppositely disposed from first platform 122.

Other structures are suitable. However, this particular structure provides for the most efficient injection molding and forming of the stick in one piece. This avoids the three (3) piece assembly problems and provides a very durable easily assembled container. It is clear that the smallest taper of the upper first platform 122 is inserted first into the tube 104.

The first platform 122 has a diameter of about 95 percent to about 99.9 percent of the diameter of the tube 104. More preferably, the first platform 122 has a diameter of about 96 percent to about 99.8 percent of the diameter of the tube 104. Most preferably, the first platform 122 has diameter of about 98 percent to about 99.7 percent of the diameter of the tube 104.

Additionally, the first platform 122 has a first tapered edge 126 and is tapered at a top portion on the edge thereof at up to about eight (8°) degrees from the side of the tube 104. More preferably, the first platform 122 is tapered at a top portion thereof at about one (1°) degree to about eight (8°) degrees from the side of the tube. Most preferably, the first platform 122 is tapered at a top portion thereof at about four (4°) degree to about six (6°) degrees from the side of the tube. In this fashion, the first platform 122 has the simplified fitting mechanism into the cardboard tube 104.

The second platform 124 has a second tapered edge 125 substantially similar to the taper characteristics of the first platform 122. Second platform 124 has a diameter from about 100.1 percent to about 107 percent of the diameter of the cardboard tube 104. More preferably, the second platform 124 has a diameter from about 100.1 percent to 105 percent of the diameter of the cardboard tube 104. Most preferably, the diameter of the second platform 124 is from about 100.1 percent to 103 percent of the diameter of the cardboard tube 104. The slightly larger diameter of second platform 124 provides a liquid impermeable seal which prevents dripping of the ice cream or other food condiment onto the hand of the user. In this fashion, substantial advantages are achieved.

Figure 9:
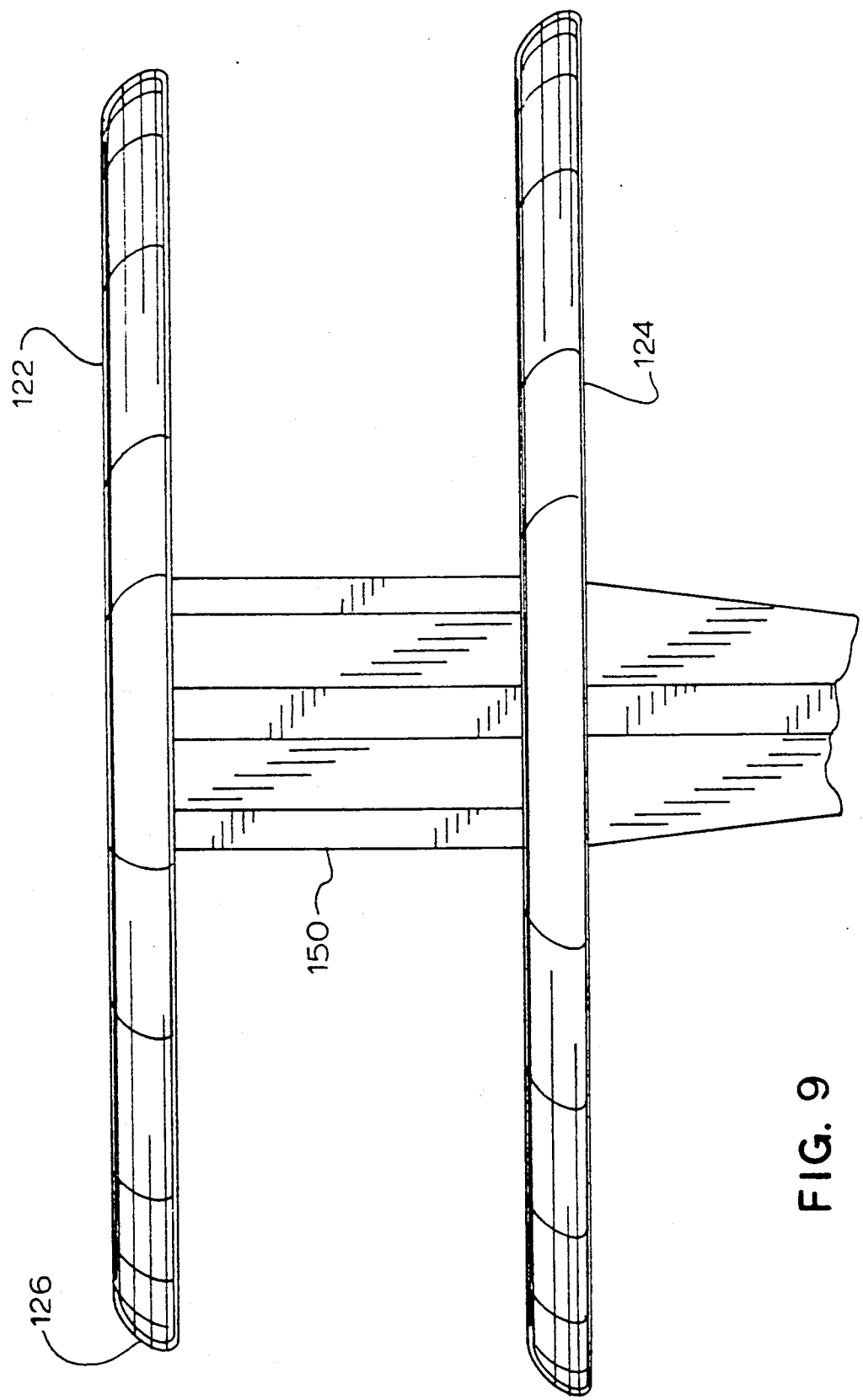
FIG. 9 depicts an edge 126 of top first platform 122 with a rounded taper.

First tapered edge 126 and second tapered edge 125 are similar in structure and assist the insertion of piston 120 into tube 104. Both first tapered edge 126 and second tapered edge 125 may be rounded as shown in FIG. 9 or straight as shown in FIG. 8. Second tapered edge 125 provides for insertion into tube 104 while second tapered edge 125 holds piston 120 in tube 104 under pressure of filling tube 104 with the food so that piston 120 is not forced out of tube 104 during the filling process.

Any suitable structure and size of piston 120 and tube 104 is operable. Tube 104 may have any suitable diameter or length. The piston 120 is adjusted to meet the size of tube 104, or the tube 104 may be adjusted to meet the size of the piston 120. Clearly tube 104 is of substantially uniform inside or outside diameter.

Generally speaking, in a preferred structure, the tube 104 is about 3.98 centimeters (1.567 inches) in diameter. Also, the cardboard cylinder 104 is about 8.73 centimeters long. The piston from the end to the top of the first platform is generally about 8.5 centimeters long. The lower platform is about 3.99 (1.570 inches) centimeters plus or minus 5 thousandths centimeter in diameter. The upper platform is 3.96 (1.56 inches) centimeters plus or minus 0.013 centimeters in diameter. Generally speaking the platforms are about 1.27 centimeters apart. And the upper platform is inserted into the lower platform at about 1.43 centimeters. In this fashion, the lower platform is about 0.16 centimeters into the tube. This provides a space in the tube of about 18.8 centimeters (7.4 inches) to receive ice cream or similar goods. Suitable variations can be made in these measurements without unduly affecting container 100. The variations are preferably proportional.

Both piston 120 and tube 104 can be made of any material suitable for holding food—such as paper or plastic. It is preferred that tube 104 be cardboard, and that piston 120 be polypropylene.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this container with piston can become clear to a person having ordinary skill in this particular art. Such modifications are clearly covered by this disclosure.

What is claimed and sought to be protected by Letters Patent of the United States is:

1. A discharge device for a dispensing container holding a food, said discharge device including a piston and said dispensing container including a tube wherein:
   a. said piston includes a first guiding platform, a second sealing platform and a stick;
   b. said first guiding platform and said second sealing platform are secured to said stick;
   c. said first guiding platform is at a first end of said stick;
   d. said second sealing platform is adjacent to said first guiding platform;
   e. said first guiding platform and said second sealing platform are at least partially flexible;
   f. said first guiding platform has a first tapered edge;
   g. said first guiding platform guides said piston into said tube;
   h. said second sealing platform is in a sealing relationship with said tuble;
   i. said first guiding platform and said second sealing platform are substantially perpendicular to said stick;
   j. said first guiding platform is substantially parallel to said second sealing platform;
   k. said second sealing platform has a second tapered edge;
   l. said first guiding platform has a diameter slightly less than a diameter of said tube;
   m. said second sealing platform has a diameter slightly larger than a diameter of said tube;
   n. said stick has a second end of said stick oppositely from said first end of said first stick;
   o. said tube has a substantially constant diameter;
   p. said second sealing platform is closer to said second end of said stick than said first platform; and
   q. said first guiding platform is inserted into said tube prior to said second sealing platform.
2. The discharge device of claim 1, wherein:
   a. an H-shaped support means separates said first guiding platform and said second sealing platform; and
   b. said H-shaped support means supports said first guiding platform and said second sealing platform.
3. The discharge device of claim 2, wherein:
   a. said H-shaped support means includes three parallel pillars; and
   b. said piston includes a stick portion below said second sealing platform and oppositely disposed from first guiding platform.
4. The discharge device of claim 3, wherein:
   a. said stick portion is fluted;
   b. said stick portion includes a ball shape on a second end of said stick portion; and
   c. said ball shape is oppositely disposed from first guiding platform.
5. The discharge device of claim 4 wherein:
   a. said first guiding platform has a guiding diameter about 95 percent to about 99.9 percent of a diameter of said tube; and
   b. said second sealing platform has a sealing diameter about 100.1 percent to about 107 percent of said diameter of said tube.
6. The discharge device of claim 5, wherein:
   a. said first guiding platform has a guiding diameter about 96 percent to about 99.8 percent of a diameter of said tube; and
   b. said second sealing platform has a sealing diameter about 100.1 percent to about 105 percent of said diameter of said tube.
7. The discharge device of claim 6, wherein:
   a. said first guiding platform has a guiding diameter about 98 percent to about 99.8 percent of a diameter of said tube; and
   b. said second sealing platform has a sealing diameter about 100.1 percent to about 103 percent of said diameter of said tube.
8. The discharge device of claim 5, wherein:
   a. said first guiding platform has a first tapered edge of up to about eight degrees from said tube; and
   b. said second sealing platform has a second tapered edge of up to about eight degrees from said tube.
9. The discharge device of claim 8, wherein:
   a. said first guiding platform has a first tapered edge of about one degree to about eight degrees from said tube; and
   b. said second sealing platform has a second tapered edge of about one degree to about eight degrees from said tube.
10. The discharge device of claim 9, wherein:
    a. said first guiding platform has a first tapered edge of about four degrees to about six degrees from said tube; and
    b. said second sealing platform has a second tapered edge of about four degrees to about six degrees from said tube.
11. A discharge device for a dispensing container holding a food, said discharge device including a piston and said dispensing container including a tube wherein:
    a. said piston includes a first guiding platform, a second sealing platform and a stick;
    b. said first guiding platform and said second sealing platform are secured to said stick;
    c. said first guiding platform is at a first end of said stick;
    d. said second sealing platform is adjacent to said first guiding platform;

e. said first guiding platform and said second sealing platform are at least partially felxible;
f. said first guiding platform has a first tapered edge;
g. said second sealing platform has a second tapered edge;
h. said first guiding platform guides said piston into said tube;
i. said first sealing platform is in a sealing relationship with said tube;
j. said first guiding platform and said second sealing platform are substantially perpendicular to said stick;
k. said first guiding platform is substantially parallel to said second sealing platform;
l. said first guiding platform has a diameter slightly less than a diameter of said tube;
m. said second sealing platform has a diameter slightly larger than a diameter of said tube;
n. said piston includes a stick portion below said second sealing platform and oppositely disposed from first guiding platform;
o. said first guiding platform has a guiding diameter about 95 percent to about 99.9 percent of a diameter of said tube;
p. said second sealing platform has a sealing diameter about 100.1 percent to about 107 percent of said diameter of said tube;
q. said stick has a second end of said stick oppositely from said first end of said first stick;
r. said tube has a substantially constant diameter;
s. said second sealing platform is situated between said second end of said stick and said first platform; and
t. said first guiding platform is inserted into said tube prior to said second sealing platform.

12. The discharge device of claim 11, wherein:
a. an H-shaped support means separates said first guiding platform and said second sealing platform;
b. said H-shaped support means supports said first guiding platform and said second sealing platform;
c. said H-shaped support means includes three parallel pillars; and
d. said stick portion is fluted;
e. said stick portion includes a ball shape on a second end of said stick portion; and
d. said ball shape is oppositely disposed from first guiding platform.

13. The discharge device of claim 12, wherein:
a. said first guiding platform has a guiding diameter about 96 percent to about 99.8 percent of a of said tube; and
b. said second sealing platform has a sealing diameter about 100.1 percent to about 105 percent of said diameter of said tube.

14. The discharge device of claim 13, wherein:
a. said first guiding platform has a guiding diameter about 98 percent to about 99.8 percent of a diameter of said tube; and
b. said second sealing platform has a sealing diameter about 100.1 percent to about 103 percent of said diameter of said tube.

15. The discharge device of claim 14, wherein:
a. said first guiding platform has a first tapered edge of up to about eight degrees from said tube; and
b. said second sealing platform has a second tapered edge of up to about eight degrees from said tube.

16. The discharge device of claim 15, wherein:
a. said first guiding platform has a first tapered edge of about one degree to about eight degrees from said tube; and
b. said second sealing platform has a second tapered edge of about one degree to about eight degrees from said tube.

17. The discharge device of claim 16, wherein:
a. said first guiding platform has a first tapered edge of about four degrees to about six degrees from said tube; and
b. said second sealing platform has a second tapered edge of about four degrees to about six degrees from said tube.

18. The discharge device of claim 17, wherein said first tapered edge and said second tapered edge are substantially flat.

19. The discharge device of claim 17, wherein said first tapered edge and said second tapered edge are substantially rounded.

* * * * *